United States Patent [19]
Rhoten

[11] Patent Number: 5,887,378
[45] Date of Patent: Mar. 30, 1999

[54] MULTI-FUNCTIONAL FISHING LURE ACCESSORY

[76] Inventor: Gregory D. Rhoten, 226 N. Linden Ave., Highland Springs, Va. 23075

[21] Appl. No.: 901,633

[22] Filed: Jul. 28, 1997

[51] Int. Cl.⁶ .................................................. A01K 85/14
[52] U.S. Cl. .......................... 43/42.03; 43/42.23; 43/42.5
[58] Field of Search .............................. 43/42.02, 42.03, 43/42.22, 42.23, 42.5

[56] References Cited

U.S. PATENT DOCUMENTS

| | | | |
|---|---|---|---|
| 1,383,546 | 7/1921 | Knowles | 43/42.5 X |
| 1,444,338 | 2/1923 | Doering | 43/42.5 X |
| 2,206,274 | 7/1940 | Wiberg | 43/45 |
| 2,294,081 | 8/1942 | Fairfax | 43/42.22 |
| 2,588,300 | 3/1952 | Smith | 43/42.09 |
| 3,305,964 | 2/1967 | Wieszeck | 43/42.03 |
| 3,488,877 | 1/1970 | Carabasse | 43/42.09 |
| 3,672,086 | 6/1972 | Terreni | 43/42.09 |
| 4,885,866 | 12/1989 | Vanderplow | 43/42.19 |
| 5,113,614 | 5/1992 | Morita | 43/42.74 |

*Primary Examiner*—Robert P. Swiatek
*Attorney, Agent, or Firm*—Norman B. Rainer

[57] ABSTRACT

A fishing lure device includes a baffle plate fabricated of sheet stock of uniform thickness and having a generally rectangular perimeter with vertical and horizontal axes. The plate has curvature with respect to both axes and is further characterized in having concave and convex surfaces. At least one pair of mounting apertures is centered on either axis. When attached to a wire loop of a standard fishing line connector, the plate oscillates in a horizontal path when pulled through the water. When allowed to descend in the water, the plate pivots to a position where the concave surface is upwardly directed, thereby slowing the rate of descent.

9 Claims, 2 Drawing Sheets

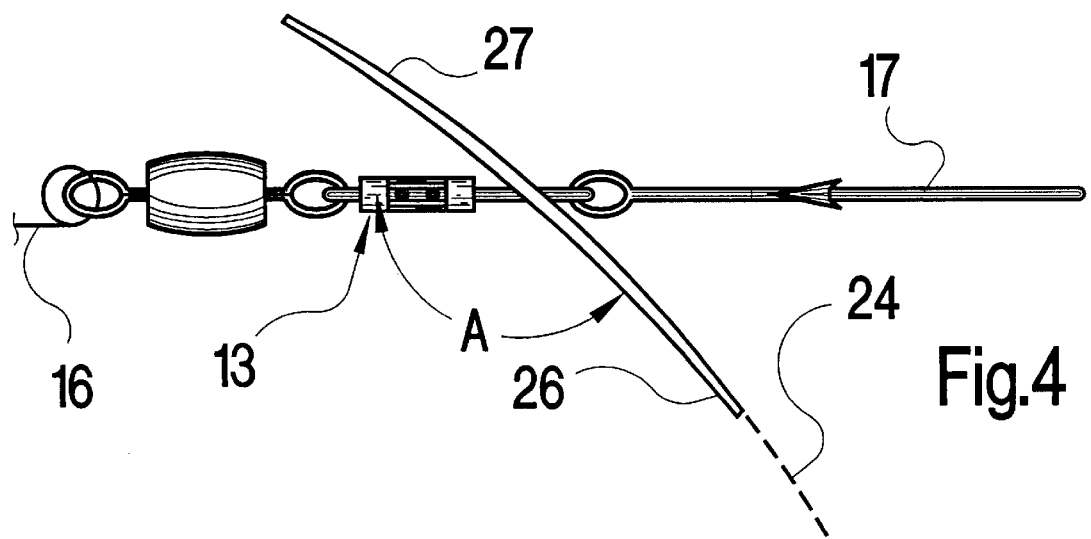
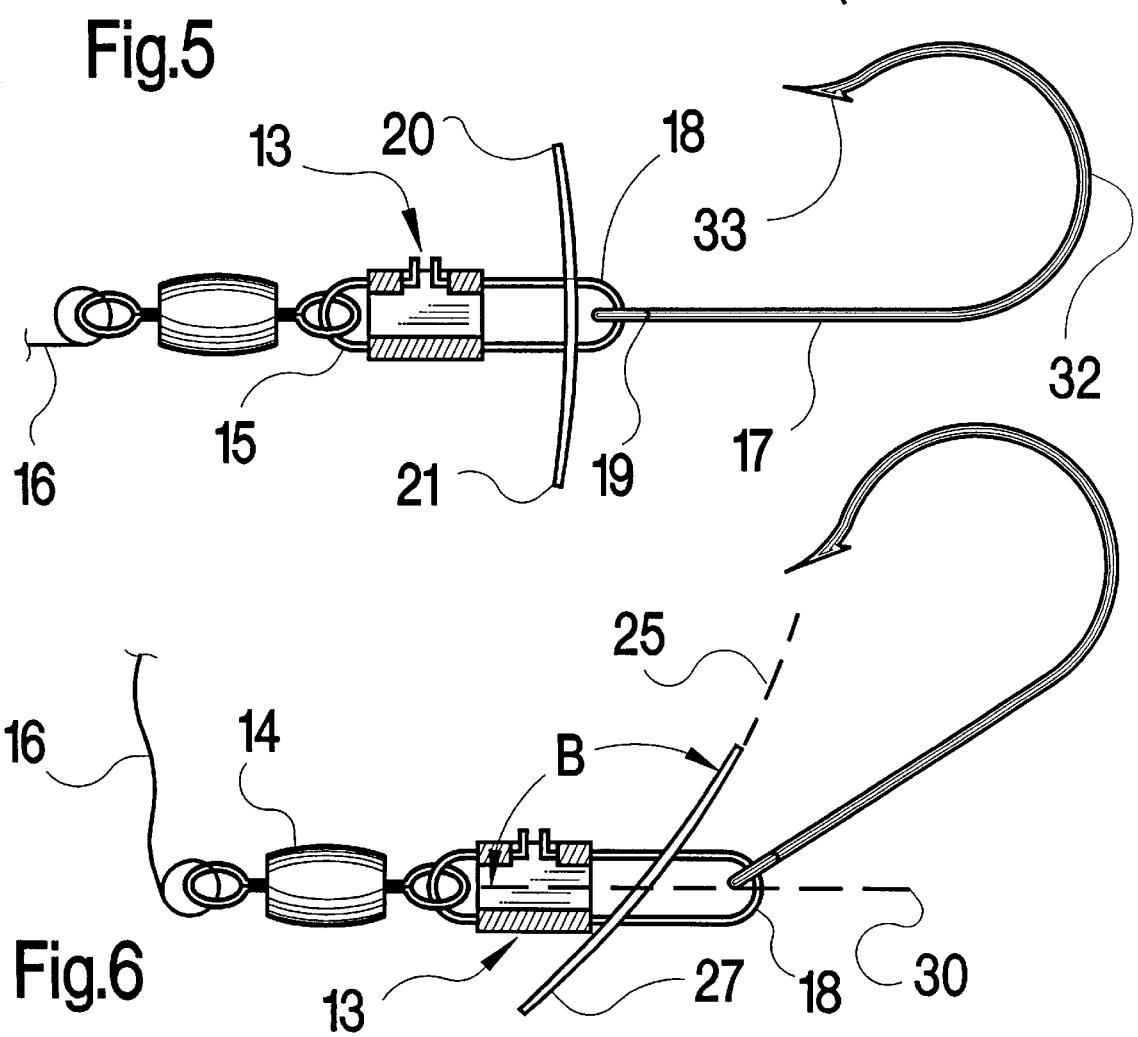

MULTI-FUNCTIONAL FISHING LURE ACCESSORY

BACKGROUND OF THE INVENTION

1. Field of the Invention

This invention relates to fishing lures as used in sport fishing, and more particularly concerns sinking-type lures that attract fish by virtue of motion achieved by being pulled through a body of water by an attached fishing lure.

2. Description of the Prior Art

In the field of fishing lure apparatus, the use of spoons, either alone or in combination with other lure components, is well known. The term "spoon" is used because of the slightly hollowed or cupped shape which characterizes such devices.

A great many kinds of spoons and mounting mechanisms for spoons have been disclosed in a variety of shapes and sizes. The most commonly employed type of spoon is pear-shaped, having a narrow extremity provided with an aperture which permits pendant mounting to the lure or fishing line. In such pendant position, the long center axis of the spoon is disposed at an angled relationship with respect to the taut fishing line that secures the lure. When pulled through the water, spoons typically rotate about their long center axis.

Spoons can also be disposed upon a fishing line or lure in a manner to produce a motion other than axial rotation. For example, spoons which presumably have a flapping motion are disclosed in U.S. Pat. No. 3,672,086. Spoons which revolve about the axis of the fishing line, and which are sometimes referred to as "spinners" are disclosed in U.S. Pat. Nos. 2,206,274, 3,488,877 and 4,885,866. Although often effective as an attractant for fish, spoons that rotate about their axis or revolve about the fishing line axis have a tendency to twist the fishing line.

Multi-lobed and propeller-shaped spinners having the specialized property of slowing the rate of descent of a sinking lure on a slack fishing line are disclosed in U.S. Pat. Nos. 5,201,859, 5,327,671 and 5,412,900 to William Rosek.

Spoon-like deflector plates are utilized on many rigid-body lures having a fish-like appearance. In such applications, the deflector plate, having a contour which is generally concave in the direction of the fishing line, is fixedly attached to the forward extremity of the lure. The function of the deflector plate is to impart a wobbling, diving or other erratic motion to the lure.

Factors that are generally considered to attract fish to an artificial lure include shape, size, color, motion, noise, vibration and reflective surfaces. Lures that provide several of said attracting features will generally be more successful or more versatile than lures providing fewer attracting factors. With respect to the motion of the lure, many fishermen manipulate their fishing rods by jerking, twitching, pulling, pumping or pause-and-retrieve operations to impart a sought movement to the lure.

In the course of pumping or pause-and-retrieve manipulation, there is a brief period of time where the lure begins a descending motion. During such descending motion, it is desirable that the lure's rate of descent be slowed, and that the lure maintains its attractiveness. Another generally valued characteristic of fishing lures is the ability to be modified by the fisherman to suit the needs of different fishing situations.

It is accordingly an object of the present invention to provide a fishing lure device which provides multiple fish-attracting factors.

It is another object of this invention to provide a lure as in the foregoing object which can be removably associated with an existing lure to improve the performance thereof.

It is a further object of the present invention to provide a lure of the aforesaid nature which can retard the rate of descent of an existing lure to which it is attached.

It is a still further object of this invention to provide a lure of the aforesaid nature of simple, durable construction amenable to low cost manufacture.

These objects and other objects and advantages of the invention will be apparent from the following description.

SUMMARY OF THE INVENTION

The above and other beneficial objects and advantages are accomplished in accordance with the present invention by a fishing lure device comprised of a baffle plate fabricated from sheet stock of uniform thickness, said baffle plate having:

a) a generally rectangular perimeter including upper and lower edges and opposed parallel side edges, b) a horizontal axis that bisects said side edges, and a vertical axis that bisects said upper and lower edges, c) a bilaterally curved contour having curvature with respect to both axes and defining a concave front surface and convex rear surface, said surfaces being highly reflective of light, and d) at least one pair of mounting apertures centered on either axis.

In another aspect of the present invention, the lure device of the present invention is comprised of a baffle plate of the aforesaid nature pivotally held by way of said mounting apertures upon a wire loop of a safety-pin type fishing lure connector, the nature of said mounting being such as to permit oscillation of the plate in a horizontal path about said vertical axis, and pivoting movement in a vertical path about said horizontal axis.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing:

FIG. 4 is a top view showing the baffle plate in a momentarily extreme position of its oscillatory motion.

FIG. 5 is a side view of the device in a forward mode of movement.

FIG. 6 is a side view of the device in a falling mode of movement.

DESCRIPTION OF THE PREFERRED EMBODIMENT

Figure 1:
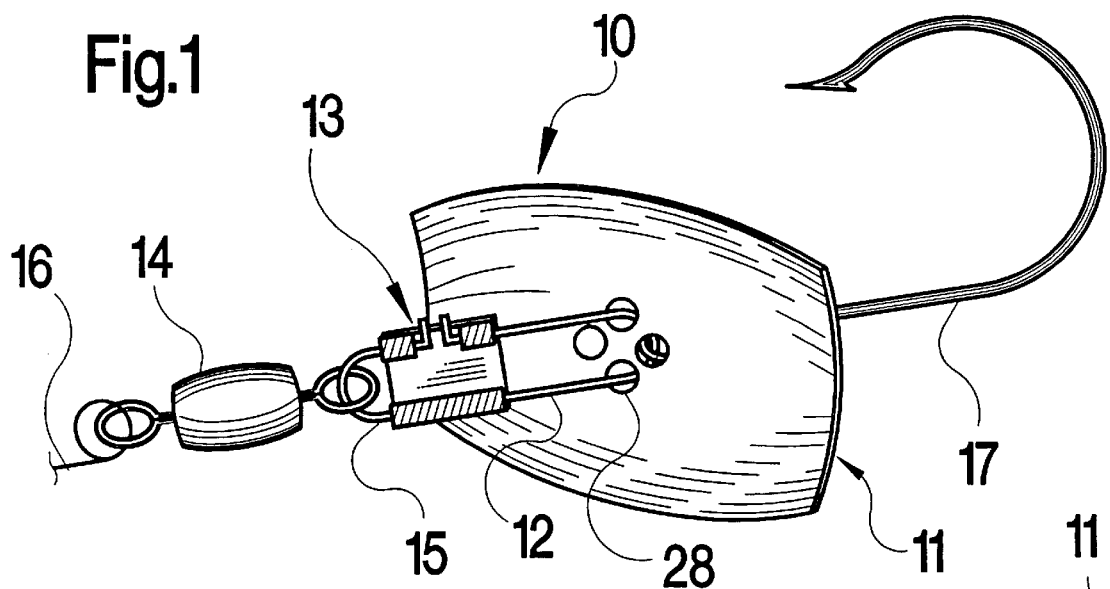
FIG. 1 is a perspective top and front view of an embodiment of the fishing lure device of the present invention shown with other lure components.
Figure 2:
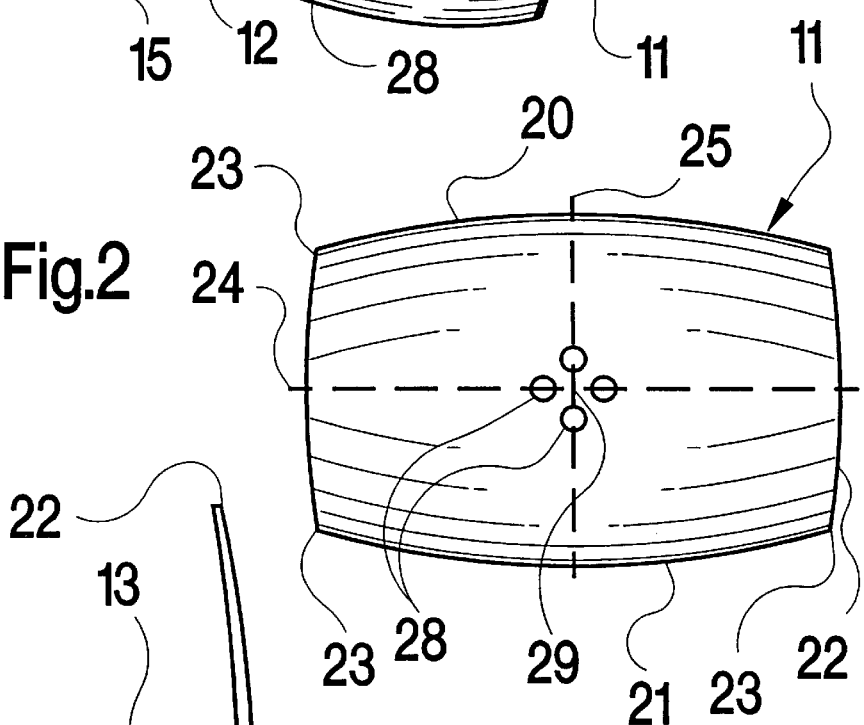
FIG. 2 is a rear view of the lure device of FIG. 1.
Figure 3:
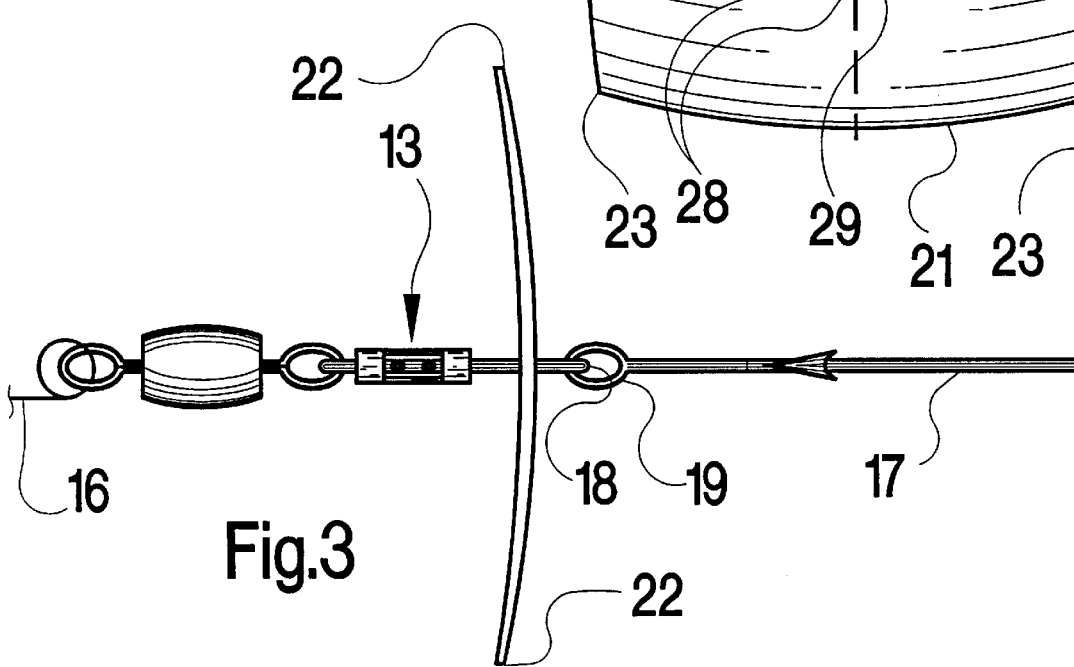
FIG. 3 is a top view of the lure device of FIG. 1 showing the baffle plate in a momentarily centered position of its oscillatory motion.

Referring now to FIGS. 1–6, an embodiment of the fishing lure device 10 of the present invention is shown comprised of baffle plate 11 mounted upon the large loop 12 of safety-pin type fishing lure connector 13. One eyelet of a standard fishing line swivel 14 is engaged by the small loop 15 of connector 13, and the opposite eyelet of swivel 14 attaches to a fishing line 16. A standard fish hook 17 is engaged by the trailing extremity 18 of large loop 12. The illustrated fish hook has an eyelet 19 disposed in a plane that is generally orthogonal to the plane of the rest of the fish hook.

Baffle plate 11 is of uniform thickness, preferably as a consequence of having been fabricated from sheet stock. Plate 11 is preferably fabricated of metal, but may alternatively be plastic. The thickness of the baffle plate is such as to cause it to be rigid and sufficiently strong to resist deformation in the course of its intended use. Baffle plate 11 has a generally rectangular perimeter comprised of upper and lower edges 20 and 21, respectively, and opposed parallel side edges 22, said edges intersecting at corners 23 disposed in coplanar relationship in a rectangular array.

Baffle plate 11 has a horizontal axis 24 that bisects said side edges, and a vertical axis 25 that bisects said upper and lower edges. Said baffle plate has a bilaterally curved contour, namely a contour having curvature with respect to both axes. Said curvature is a such as to produce a concave front surface 26 and convex rear surface 27.

Said curvature is such that said surfaces are substantially of a cylindric nature, namely surfaces generated by a straight generating line moved along a curved path while remaining in parallel disposition to a stationary reference line. When the curved path is a circle or an arc of a circle, the distance between the reference line and generating line is a radius of curvature.

In the case of the curved surfaces of baffle plate 11, said stationary reference line is parallel to either of said axes. The amount of curvature may be characterized in terms of radius of curvature and the degrees of circular arc occupied by either surface. The radius of curvature about horizontal axis 24 may range between about 1 and 5 inches. The radius of curvature about vertical axis 25 is greater than the radius of curvature about the horizontal axis. The extent of the curvature about either axis of plate 11 is such as to occupy between about 25 to 55 degrees of circular arc. Both the concave and convex surfaces of baffle plate 11 are highly reflective.

At least one pair of apertures 28 is centered upon either the horizontal or vertical axis of baffle plate 11. In a preferred embodiment, a pair of apertures is centered upon each axis. The apertures are preferably circular, and are disposed in equally spaced relationship with respect to the intersection 29 of said axes.

The function of said paired apertures is to permit insertive engagement by the large loop 12 of safety-pin type connector 13 in a manner to produce a lure assembly wherein said concave surface faces the small loop 15 of the connector. The size and spacing of said apertures are of critical importance in securing the objectives of the lure device of this invention. In particular, loop 12 should be sufficiently loosely held by said apertures such that baffle plate 11 can oscillate in a horizontal path by virtue of the force of water acting against concave surface 26. The extent or amplitude of such oscillation is such as to permit baffle plate 11 to be disposed, at one extreme of oscillatory motion, at an obtuse angle A, shown in FIG. 4, having a value of between 120 degrees and 160 degrees. Angle A is measured between horizontal axis 24 and the plane of connector 13. In addition, the size and spacing of said apertures are such as to permit baffle plate 11 to undergo a pivoting movement in a vertical path whereby, at a position of maximum movement as shown in FIG. 6, baffle plate 11 is disposed at an obtuse angle B of at least 110 degrees. Angle B is measured between the longitudinal axis 30 of connector 13, and vertical axis 25.

By virtue of the aforesaid combination of components and their interaction, when lure device 10 of this invention is pulled through the water, baffle plate 11 undergoes oscillatory motion in a horizontal path, causing the lure to have a wobbling motion, while also producing a flashing effect and a rattling noise. When the fishing line is allowed to go slack, permitting the lure device to descend in the water, baffle plate 11 pivots about the large loop of connector 13, causing the concave surface to become upwardly directed. The greater hydrodynamic resistance produced by such posture slows the descent of the lure, thereby allowing it to spend more time in the fishing "strike" zone.

It is important that the plane of fish hook 17, namely the plane containing shank portion 31, curved portion 32, and barbed portion 33 be vertically oriented. Commercially available fish hooks have their attachment eyelet 19 disposed either within the plane of the fish hook, or orthogonal to it. In the case of orthogonally disposed eyelets, as is the case with the fish hook exemplified in FIGS. 1 and 3–6, connector 13 must be vertically oriented so as to cause the plane of the fish hook to be vertically positioned. Accordingly, connector 13 engages the pair of apertures 28 centered upon vertical axis 25.

When the fish hook is one having its attachment eyelet disposed in coplanar relationship with the plane of the fish hook, connector 13 should be horizontally disposed. To accomplish this, large loop 18 of the connector is caused to engage the pair of apertures 28 which are centered upon horizontal axis 24.

Because the preferred embodiment of baffle plate 11 has two sets of apertures 28, namely a pair of apertures centered upon both the horizontal and vertical axes, the baffle plate can be utilized with either type of commercial fish hook. The fish hook, in turn, may be equipped with a bait or other fish-attracting lure component.

While particular examples of the present invention have been shown and described, it is apparent that changes and modifications may be made therein without departing from the invention in its broadest aspects. The aim of the appended claims, therefore is to cover all such changes and modifications as fall within the true spirit and scope of the invention.

Having thus described my invention, what is claimed is:

1. A fishing lure device comprised of a baffle plate fabricated from sheet stock of uniform thickness, said baffle plate having:

a) a generally rectangular perimeter including upper and lower edges and opposed parallel side edges, b) a horizontal axis that bisects said side edges, and a vertical axis that bisects said upper and lower edges, c) a bilaterally curved contour having curvature with respect to both axes and defining a concave front surface and convex rear surface, said surfaces being highly reflective of light, and d) a pair of mounting apertures centered on both axes.

2. The fishing lure device of claim 1 further comprised of a safety-pin type fishing lure connector having a longitudinal axis and a wire loop which pivotally secures said baffle plate by way of said mounting apertures, the nature of said securement being such as to permit oscillation of the plate in a horizontal path about said vertical axis, and pivoting movement in a vertical path about said horizontal axis.

3. The fishing lure device of claim 2 wherein said connector is comprised of a small loop and a large loop in substantially coplanar disposition upon said longitudinal axis, said large loop engaging said baffle plate.

4. The fishing lure device of claim 3 wherein the baffle plate is engaged by said large loop, and the concave surface of said baffle plate faces said small loop.

5. The fishing lure device of claim 2 wherein the amplitude of said oscillation is such as to permit said baffle plate to be disposed, at one extremity of said oscillation at an obtuse angle A, measured between said horizontal axis and the plane of said loop, said angle A having a value of between 120 degrees and 160 degrees.

6. The fishing lure device of claim 2 wherein said pivoting movement is such that, at an extremity of such movement, said baffle plate is disposed at an obtuse angle B, measured between the longitudinal axis of said connector and said vertical axis, said angle B having a value of at least 110 degrees.

7. The fishing lure device of claim 2 wherein, when attached to a fishing line that is allowed to go slack, thereby permitting descent of the device through the water, said baffle plate pivots about said loop, causing said concave surface to become upwardly directed and thereby slowing the rate of said descent.

8. A fishing lure device comprised of a baffle plate fabricated from sheet stock of uniform thickness, said baffle plate having:

a) a generally rectangular perimeter including upper and lower edges and opposed parallel side edges, b) a horizontal axis that bisects said side edges, and a vertical axis that bisects said upper and lower edges, said axes intersecting, c) a bilaterally curved contour having curvature with respect to both axes and defining a concave front surface and convex rear surface, and d) at least one pair of mounting apertures centered on each axis and disposed in equally spaced relationship with respect to the site of intersection of said axes.

9. A fishing lure device comprised of a baffle plate fabricated from sheet stock of uniform thickness, said baffle plate having:

a) a generally rectangular perimeter including upper and lower edges and opposed parallel side edges, said edges intersecting at corners disposed in coplanar relationship, b) a horizontal axis that bisects said side edges, and a vertical axis that bisects said upper and lower edges, c) a bilaterally curved contour having curvature with respect to both axes and defining a concave front surface and convex rear surface, and d) at least one pair of mounting apertures centered on either axis.

\* \* \* \* \*